(No Model.) 2 Sheets—Sheet 1.
P. HOWE.
CLOTH CUTTING MACHINE.
No. 520,598. Patented May 29, 1894.
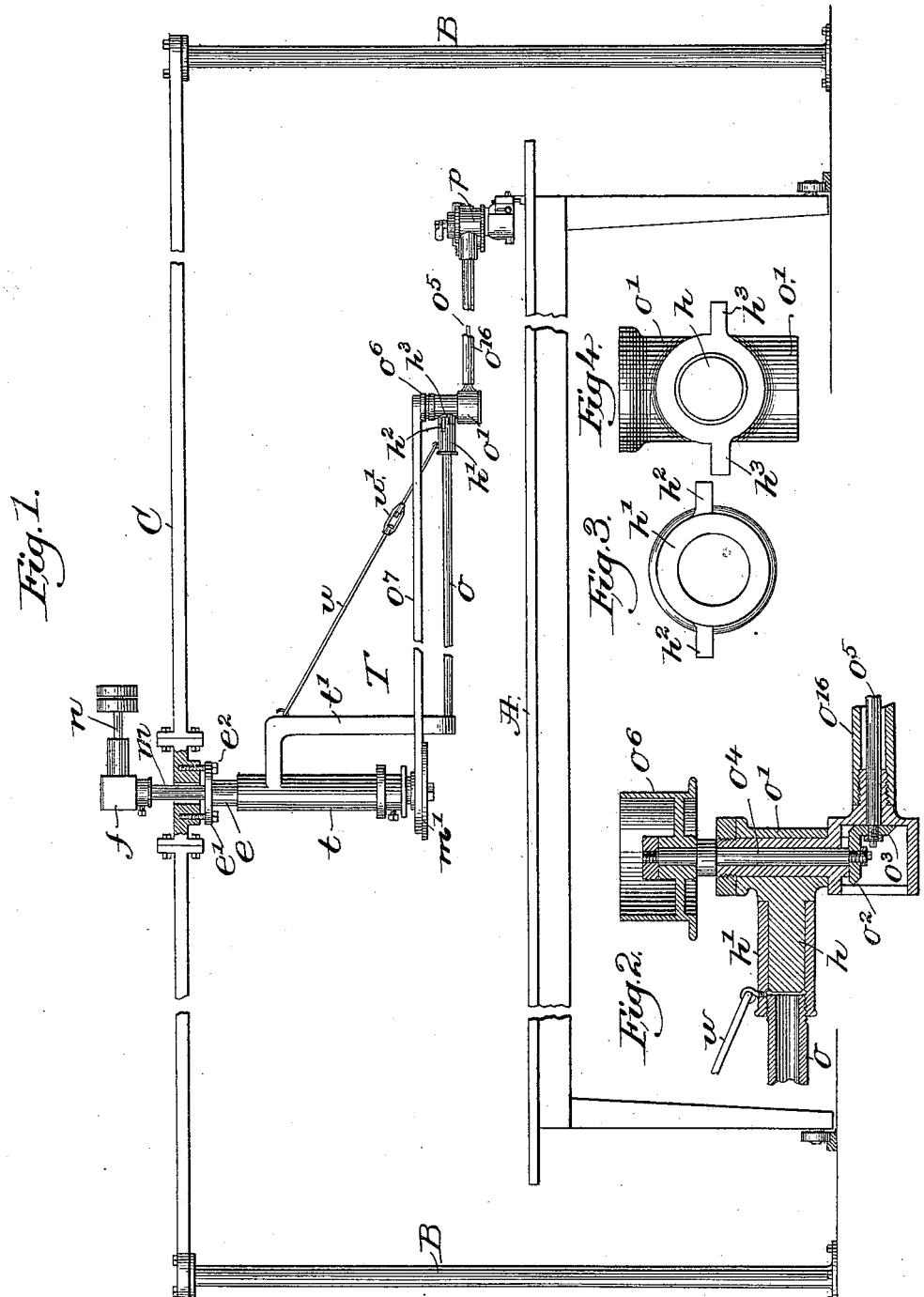
Witnesses:
Edward F. Allen.
Louis N. Howell
Inventor:
Patrick Howe
by Crosby & Gregory Attys.

(No Model.) 2 Sheets—Sheet 2.
P. HOWE.
CLOTH CUTTING MACHINE.
No. 520,598. Patented May 29, 1894.
Fig. 5.
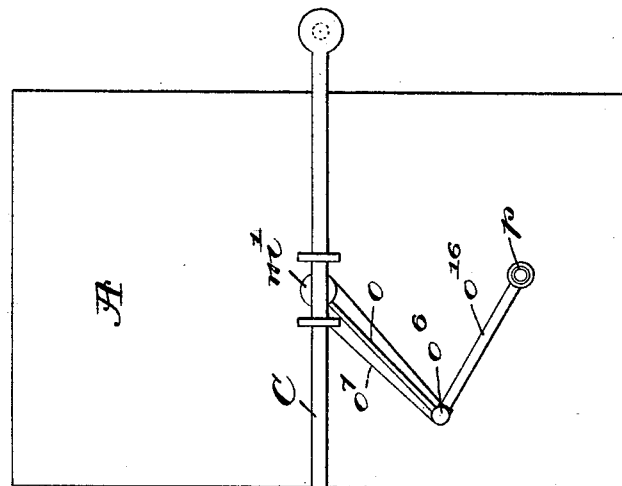
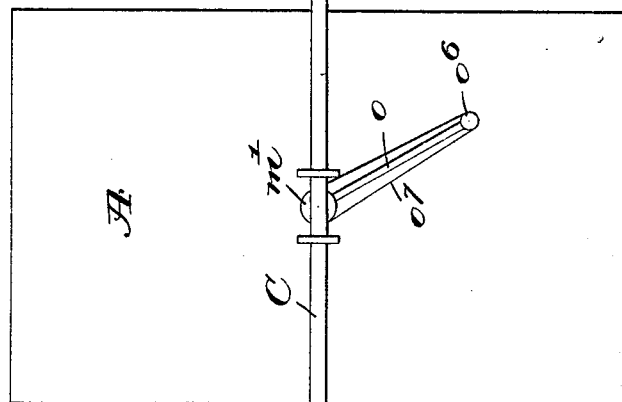
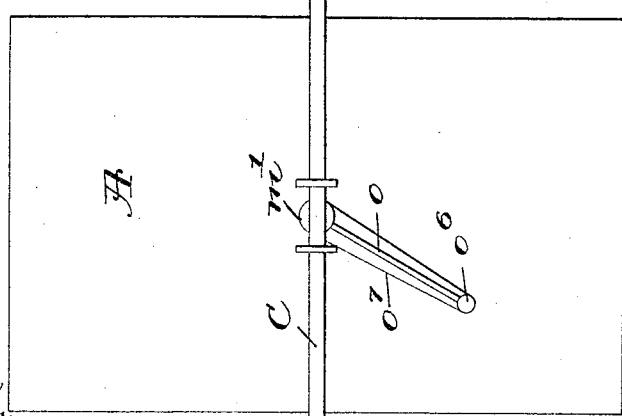
Witnesses.
Edward F. Allen
Louis N. Gowell
Inventor.
Patrick Howe
by Crosby & Gregory
Attys.
THE NATIONAL LITHOGRAPHING COMPANY,
WASHINGTON, D. C.

UNITED STATES PATENT OFFICE.

PATRICK HOWE, OF BOSTON, MASSACHUSETTS, ASSIGNOR OF FIVE-SIXTHS TO ISAAC FENNO, RICHARD D. GOODWIN, AND CHARLES M. BLAKE, OF SAME PLACE, AND MARTHA A. TOLMAN, ADMINISTRATRIX, OF NEWTON, AND HENRY G. HARTSHORNE, OF WAKEFIELD, MASSACHUSETTS.

CLOTH-CUTTING MACHINE.

SPECIFICATION forming part of Letters Patent No. 520,598, dated May 29, 1894.

Application filed September 17, 1892. Serial No. 446,173. (No model.)

*To all whom it may concern:*

Be it known that I, PATRICK HOWE, of Boston, county of Suffolk, State of Massachusetts, have invented an Improvement in Cloth-Cutting-Machines, of which the following description, in connection with the accompanying drawings, is a specification, like letters on the drawings representing like parts.

This invention relates to cloth cutting machines of the class wherein a rotating cutter is so mounted as to be moved about upon a cutting table, such a machine being illustrated in my Patent No. 441,243, dated November 25, 1890.

Heretofore in the use of machines of this class in manufacturing establishments it has been customary to equip a single cutting table only with a cutting machine, the cloths being laid out and marked on various other tables and then brought to the cutting table to be cut by the cutting machine. With the demand for increased and quicker production, and the increased capacity of the cutting machines, the number of thicknesses of cloth to be cut at once has been increased to such an extent that it is sometimes difficult to transfer the several thicknesses of marked cloth to the cutting table without disarranging the cloths. In seeking to avoid this difficulty, in accordance with this invention, I provide each marking table with a suitable support for a cutter head and an actuating shaft to actuate a cutter, there being one support and one actuating shaft for each table, and I employ in connection therewith a single cutter head which by means of suitable connecting devices is or may be readily attached to any of the several supports and their actuating shafts to temporarily form a complete cutting machine at any of the several tables for the purpose of cutting the cloth upon that table, the cutter head being then detached from the support and actuating shaft to which it was connected, and transferred to the support at another table to render the cutting machine at such other table complete for the purpose of cutting the cloth upon such table, the cutter head being thus transferred to and to cut the cloth upon the several tables in succession.

One part of this invention therefore comprehends a cloth cutting machine containing the following instrumentalities, viz:—a stationary support, and an actuating shaft, a removable cutter-head driven from and by said shaft, and a jointed connection between the said support and cutter-head whereby the latter is sustained by, yet rotatable upon the said support, and a detachable coupling interposed in said jointed connection and located between the cutter-head and support whereby the cutter-head may be readily removed from one support and coupled to another similar support, as will be hereinafter described.

Other features of this invention, together with the preferred details of construction, will be hereinafter described and pointed out in the claims.

Figure 1 of the drawings represents in elevation, partially broken away, a cutting table provided with a temporarily complete cutting machine in accordance with this invention; Fig. 2, a sectional detail showing one form of detachable coupling by which the permanent or stationary and the removable portions are connected together to form an operative machine. Figs. 3 and 4 show the co-operating coupling members detached and uncoupled, and Fig. 5 shows in plan view a series of marking and cutting tables provided each with a support and actuating shaft, and a single cutter head for the several supports adapted to be connected in succession to each.

Referring to the drawings, the invention is illustrated as embodied in a cutting machine of the class shown and described in my United States Patent No. 441,243, previously referred to, and to which reference may be had for a detailed description of its construction and operation, like letters representing like parts.

The marking and cutting tables A are located or distributed with relation to each other as desired, and at each table are placed two standards B, the connecting cross-bar C carrying a support *e* for the revolving hub *t* of the main arm T, which constitutes one member of a jointed sustaining connection between the support $e$ and cutter head to be described, the vertical driving shaft $m$ within the support, the driving pulley $m'$ at its lower end, and power shaft $n$ geared to its upper end and provided with the usual fast and loose pulleys, all of which are substantially as shown and described in the said patent. Each table is therefore provided with a support for and to sustain the weight of a cutter head and an actuating shaft to drive a cutter head, and in accordance with this invention a single cutter head $p$ is employed, suitable connecting devices being provided by which the head may be readily applied to or removed from the said supports and actuating shafts for the several tables in succession. In the drawings, the cutter head is shown carried at the outer end of an auxiliary arm $o^{16}$ which arm at its end opposite the head is attached to the head or hub $o'$ in which is journaled the vertical shaft $o^4$. This vertical shaft $o^4$ through the bevel gears $o^2$, $o^3$, actuates the shaft $o^5$ within the auxiliary arm $o^{16}$, said shaft $o^5$ in turn actuating the cutter on the cutter head. The vertical shaft $o^4$ at its upper end is provided with a pulley $o^6$ which is driven from the pulley $m'$ on the actuating shaft by a belt $o^7$ as in the patent referred to.

The removable cutter head is and may be connected or coupled to its support and actuating shaft in any suitable manner to permit the cutter head to be detached and transferred to another table and readily connected or coupled to the support and actuating shaft at that table to temporarily form a complete cutting machine for the purpose of cutting the cloth upon that table. I prefer, however, to make the connection as shown in the drawings, wherein the head $o'$ is provided with a projection $h$, Figs. 2 and 4, adapted to be inserted into any of the sockets $h'$ on the ends of the main arms T carried by the several supports $e$, the socket and heads being provided respectively with lateral ears $h^2$ and $h^3$ which when the projection is inserted into a socket, lock together and constitute a locking device to prevent rotative movement of one arm with relation to the other, a locking device of some kind being necessary, for should the auxiliary arm be rotated even to the slightest degree with relation to the main arm, such would be sufficient to raise the tip of the toe of the cutter head from the surface of the cutting table and cause it to skip one or more of the lower thicknesses of cloth to be cut.

In the operation of my machine when the cloth at one table has been cut, the belt $o^7$ is slipped from the pulley $o^6$ and the projection $h$ on the head $o'$ is withdrawn from the socket in the arm $o$, and the said head, its auxiliary arm $o^{16}$, and cutter head $p$ removed bodily to another table where the projection $h$ is inserted in the socket $h'$ on the arm $o$ of the main supporting arm at such table, the belt $o^7$ at such table slipped upon the pulley $o^6$, and the cutting machine at such table is rendered for the time being complete, to permit the cloth at such table to be cut, after which the cutter head with its attached parts may be again detached and transferred to still another table, and so on, as necessary, the cutter being transferred from table to table to render temporarily complete the cutting machines at the several tables, for the purpose of cutting the cloths at such tables.

While I have herein shown the detachable coupling or connection between the cutter head and its supports as formed at the head $o'$, the auxiliary arm $o^{16}$ being removable with the cutter head, still I desire it to be understood that this invention is not restricted to this particular location of the detachable coupling or connection between the cutter head and its support.

I claim—

1. A cloth cutting machine of the class described, containing the following instrumentalities, viz;—a stationary support an actuating shaft, a removable cutter head driven from and by said shaft, a jointed connection between the said support and cutter head whereby the latter is sustained by yet rotatable about the said support, and a detachable coupling interposed in said jointed connection and located between the cutter head and support whereby the cutter head may be readily removed from one support and coupled to another similar support, substantially as described.

2. In a cloth cutting machine of the class described, a support, and a main arm carried thereby and revoluble about said support; combined with an auxiliary arm carrying a cutter head, and a detachable coupling connecting the said auxiliary arm with said main arm, substantially as described.

3. In a cloth cutting machine of the class described, a support, and a main arm carried thereby and revoluble about said support, combined with an auxiliary arm carrying the cutter head, a detachable coupling connecting the said auxiliary arm with said main arm, and a locking device to prevent rotatable movement of one arm with relation to the other, as described.

In testimony whereof I have signed my name to this specification in the presence of two subscribing witnesses.

PATRICK HOWE.

Witnesses:
FREDERICK L. EMERY,
EMMA J. BENNETT.